3,149,149
PROCESS FOR RECOVERY OF CATALYST IN
ACRYLONITRILE SYNTHESIS
James G. Gorman, Kinston, N.C., and Alwyn Charles
Buckland, New Orleans, La., assignors to American
Cyanamid Company, New York, N.Y., a corporation
of Maine
No Drawing. Filed May 12, 1961, Ser. No. 109,523
8 Claims. (Cl. 260—465.3)

This invention relates to the production of acrylonitrile by the catalytic reaction of acetylene and hydrogen cyanide. More particularly, it relates to an improvement in the recovery of catalyst used in the reaction. Still more particularly, it relates to a method for regenerating the copper values from a deactivated or spent catalyst solution employed in the reaction.

The production of acrylonitrile from acetylene and hydrogen cyanide in the presence of a Nieuwland-type catalyst is, of course, a well known commercial process. In the process which is carried out at about 70–100° C., gaseous acetylene and hydrogen cyanide are introduced into an acidic aqueous solution containing a copper salt such as cuprous chloride, bromide or iodide or mixture thereof as the catalyst and an ammonium or alkali metal chloride or bromide as a solubilizer thereof. In order to maintain the acidity of the catalyst solution, a strong mineral acid, such as hydrochloric, hydrobromic, phosphoric or sulfuric is added thereto. The acrylonitrile so formed is removed from the reaction chamber by a current of acetylene and is dissolved out of the gas stream by absorption in water or by condensation and is further isolated by fractional distillation. The excess of acetylene is then returned to the reaction chamber. During the continuous operation of the process not infrequently non-volatile high molecular weight tarry or resinous materials accumulate in the reaction chamber thus fouling the mixture and retarding the reaction. The tarry or resinous materials which are formed result, in part, from impurities in the acetylene used, such as diacetylene and allylene, and, in part, from other unsaturated compounds, such as vinyl acetylene, divinyl acetylene and cyanobutadiene formed as by-products during the synthesis of acrylonitrile, and even from acrylonitrile itself. As a result of the accumulation of such tarry or resinous materials the activity of the catalyst solution is gradually lowered and in time becomes so low that its further usefulness is impaired. Consequently, the apparatus becomes clogged with such tarry or resinous materials and the synthesis must ultimately become discontinued in order to renew the catalyst solution which has become relatively inactive as compared with its original activity. The spent catalyst mixtures which are withdrawn from the reaction chamber may vary from free flowing suspension containing pellets or granules of tars or resins to plastic or gummy masses of tars and resins which contain large quantities of copper and/or cuprous halides in addition to ammonium halides all of which are of high potential value for further catalytic reaction.

The method taught by the Carpenter patent, United States 2,840,592, offers a very straightforward process for regenerating such tar bearing spent catalyst solutions. The method there disclosed involves diluting a tar bearing cuprous chloride catalyst solution with water whereby a major portion of the tars remains in the solution or mother liquor while a major portion of the copper content precipitates out as cuprous chloride and cuprous cyanide. The precipitated copper salts are then employed directly as catalyst in the reaction chamber after separation from the mother liquor without additional regeneration or purification steps. The copper salts thus precipitated constitute from 80–95% of the dissolved copper content of the withdrawn spent catalyst solution.

The present invention constitutes an improvement over that disclosed in the above-mentioned Carpenter patent. When it is noted that the mother liquor may contain copper values in an amount ranging from about 1–5%, it becomes readily apparent that the disposal of this mother liquor as waste, which is the procedure ordinarily practiced, represents a significant loss of valuable materials which might otherwise be recycled to the main body of catalyst solution. Consequently, any reduction in the loss of copper content of such hitherto discarded mother liquor solutions would markedly lower the over-all costs of the synthesis of acrylonitrile.

It has now been discovered that virtually complete recovery of the copper values in a spent catalyst solution which has been withdrawn from an acrylonitrile synthesis reactor may be accomplished in a surprisingly efficient manner. Heretofore, following the teaching of the Carpenter patent, since the concentration of copper remaining in the discarded mother liquor was at a level of approximately 10,000 to 50,000 parts per million (1 to 5%) it was necessary to compensate for this loss of copper. Additional copper was provided in the form of cuprous chloride, cuprous cyanide, cupric chloride, or cupric acetate in order to maintain the original range of copper concentration in the main body of the catalyst. Such adjustment of the copper concentration thus increased the over-all cost of the process. This disadvantageous and uneconomical procedure has now been virtually overcome and substantially eliminated by the present invention whereby the amount of copper in the discarded mother liquor or effluent is reduced to a level of approximately 1,000 parts per million (0.1%) from the level originally present in the mother liquor of approximately 10,000 to 50,000 parts per million (1–5%).

The present invention involves diluting a withdrawn catalyst solution containing tarry and resinous materials from an acrylonitrile synthesis reactor with water whereby a major part of the copper content precipitates mainly as cuprous salts such as cuprous chloride and cuprous cyanide, separating the precipitated solids from the diluted catalyst solution and returning the precipitate to the main body of catalyst solution in the reactor, adding acetylene to the effluent or filtrate or mother liquor under controlled pH conditions whereby cuprous acetylide is precipitated, separating the precipitated cuprous acetylide from the solution, adding a mineral acid to the precipitated cuprous acetylide so as to regenerate acetylene therefrom and returning the acidic slurry or solution containing copper to the reactor.

The rate of withdrawal of spent catalyst solution is dependent upon the content of tarry or resinous material present in the main body of the catalyst solution. In general, catalyst solution is withdrawn continually or periodically when the production rate of acrylonitrile has fallen to a value approximately one-fifth to one-sixth of the rate achieved at the initial activity of the fresh catalyst.

Preferably, the essential steps of this process, i.e., the precipitation of cuprous chloride, cuprous cyanide, and cuprous acetylide and the regeneration of acetylene, are accomplished in the absence of air in order to insure that the copper remains in the cuprous form. Maintaining a blanket of an inert gas such as nitrogen, natural gas or the like over the vessels employed in precipitation, filtration, decantation, etc. has been found to be very effective and is preferred. Similarly the use of oxygen free water for processing is advantageous and is preferred inasmuch as the oxidation of the cuprous ion to the cupric ion is to be avoided. If some of the cupric ion is allowed to form, water soluble cupric salts, e.g., cupric ammonium chloride, cupric cyanide, and cupric chloride usually are formed and these are lost when the incoluble cuprous salts such as cuprous chloride, cuprous cyanide and cupric acetylide are washed. Such loss represents needless disposal of valuable and recoverable copper values. The amount of water used for dilution of the spent withdrawn catalyst solution may range from an amount from about 1 to 11 volumes of water for each volume of catalyst solution. Generally, however, a dilution ratio of 5:1 to 10:1 is eminently satisfactory while a dilution ratio of about 7:1 water to catalyst solution is preferred. After dilution of the spent withdrawn catalyst solution, the precipitated solids, containing principally cuprous chloride and cuprous cyanide, are allowed to settle and are subsequently returned to the reactor. The effluent or filtrate or mother liquor is then decanted to a precipitator and is adjusted to a pH of about 3 to about 5.5 and preferably to about 3.9 to about 4.2 by the addition of ammonia, an alkali metal hydroxide such as sodium hydroxide, potassium hydroxide or an alkaline earth metal hydroxide such as barium hydroxide, calcium hydroxide and the like. Acetylene is then passed through or over the solution while maintaining a pH of about 4, by the continuous or periodic addition of ammonia, an alkali metal hydroxide or an alkaline earth metal hydroxide. After a suitable reaction time, i.e., when analysis of the supernatant solution shows essentially no copper, the precipitate of cuprous acetylide is allowed to settle. The precipitate is separated from the mother liquor and is preferably washed with water at this stage. A mineral acid such as hydrochloric, phosphoric, sulfuric and the like is then admixed with the precipitate so as to dissolve the same liberating acetylene which may be recycled to the reactor. An acidic solution or slurry of cuprous salts alone or together with solubilizing salts such as ammonium chloride, sodium chloride, potassium chloride, inter alia, is then returned to the acrylonitrile synthesis reactor for subsequent use. Of course, adjustments in the over-all catalyst recipe may be made at this point so as to adjust for any minute loss of the Nieuwland catalyst components.

The pH at which the cuprous acetylide is precipitated is extremely critical and maintaining of the pH within a critical range is an essential feature of this invention. At a pH of between about 3.0 and 5.5 and preferably between about 3.9 and 4.2 cuprous acetylide is rapidly precipitated as a reddish brown precipitate from the mother liquor. At high pHs there is a tendency for ammonia complexes to form thus complicating the regeneration step. This precipitate is then allowed to settle in the precipitator. It is then separated from the effluent by centrifugation, filtration, gravity separation or other conventional methods of separation. The precipitate is then washed with water and the washing together with the effluent liquor is disposed of as waste.

The cuprous acetylide slurry is then transferred to a solution tank where a mineral acid is added to the slurry. The acid slurry or acid solution of cuprous salt which is obtained is then added to the operating reactor directly without further purification.

In order to illustrate the principal features of the present invention without in any way attempting to restrict the scope of the invention except insofar as may be found in the claims hereinafter the following example is given.

*Example*

Operating acrylonitrile catalyst is withdrawn from the reactor and diluted under a nitrogen blanket with oxygen free water in a water to catalyst volume ratio of 7:1. The solids, principally cuprous chloride, are allowed to settle. The mother liquor containing ammonium chloride, cuprous chloride and "tar" is decanted to a precipitator and the cuprous chloride slurry is returned to the reactor.

In the precipitator the mother liquor containing approximately 1% copper by weight is adjusted to pH 4 by addition of ammonia gas. Acetylene is passed through the solution and the pH decrease is prevented by the continuous addition of ammonia to maintain pH of 4. After a suitable reaction time (i.e. when the supernatant solution shows essentially no copper) the precipitate of copper acetylide is allowed to settle and the mother liquor containing now approximately .02% copper by weight is sent to waste through a filter. The precipitate is washed with water at this stage. A 38% solution of hydrochloric acid is then added to the precipitate and dissolves it liberating mainly acetylene which is recycled leaving an acidified solution of cuprous chloride and ammonium chloride. This solution is recycled to the acrylonitrile reactor. A copper recovery of better than 97% is obtained.

We claim:

1. In a continuous process for the production of acrylonitrile by the reaction of acetylene and hydrogen cyanide in the presence of an aqueous acidic cuprous halide catalyst solution wherein spent catalyst solution is withdrawn from the reactor and diluted with water to precipitate cuprous salts, and said precipitated cuprous salts are returned to said reactor after separation from said diluted acidic catalyst solution, the improvement of
   (1) adding acetylene to said diluted acidic catalyst solution while maintaining the pH thereof between about 3 and 5.5 by the addition of alkali selected from the group consisting of ammonia, alkali metal hydroxides and alkaline earth metal hydroxides whereby cuprous acetylide is precipitated;
   (2) separating said precipitate from said solution;
   (3) adding a mineral acid selected from the group consisting of hydrochloric, sulfuric and phosphoric acids to said precipitate whereby acetylene is regenerated and a cuprous salt of said acid is obtained; while carrying out said steps (1), (2), and (3) in the absence of oxygen; and
   (4) returning said salt to said reactor.

2. A process as in claim 1 in which the pH is about 3.9 to 4.2.

3. A process as in claim 2 in which the pH is maintained at 3.9 to 4.2 by the addition of ammonia.

4. A process as in claim 2 in which the pH is maintained at 3.9 to 4.2 by the addition of alkali metal hydroxide.

5. A process as in claim 4 in which the alkali metal hydroxide is sodium hydroxide.

6. A process as in claim 2 in which the mineral acid is hydrochloric acid.

7. A process as in claim 2 in which the mineral acid is sulfuric acid.

8. A process as in claim 1 in which said regenerated acetylene is returned to said reactor.

References Cited in the file of this patent
UNITED STATES PATENTS

| 2,840,592 | Carpenter | June 24, 1958 |
| 2,956,029 | Higgins et al. | Oct. 11, 1960 |